(12) United States Patent
Ide et al.

(10) Patent No.: US 11,541,911 B2
(45) Date of Patent: Jan. 3, 2023

(54) DRIVING CONTROL DEVICE OF AUTONOMOUS-DRIVING VEHICLE

(71) Applicant: Toyota Jidosha Kabushiki Kaisha, Toyota Aichi-ken (JP)

(72) Inventors: Hirohito Ide, Nagoya (JP); Yuchi Yamanouchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 125 days.

(21) Appl. No.: 17/061,827

(22) Filed: Oct. 2, 2020

(65) Prior Publication Data

US 2021/0101621 A1 Apr. 8, 2021

(30) Foreign Application Priority Data

Oct. 4, 2019 (JP) .............................. JP2019-183707

(51) Int. Cl.
*B60W 60/00* (2020.01)
*B60W 10/20* (2006.01)
*B60W 40/08* (2012.01)
*B60W 30/14* (2006.01)

(52) U.S. Cl.
CPC ........ *B60W 60/0051* (2020.02); *B60W 10/20* (2013.01); *B60W 30/143* (2013.01); *B60W 40/08* (2013.01); *B60W 60/001* (2020.02); *B60W 2420/52* (2013.01); *B60W 2510/20* (2013.01)

(58) Field of Classification Search
CPC ............. B60W 10/20; B60W 2510/20; B60W 30/143; B60W 60/001; B62D 15/025; B60K 2026/029
See application file for complete search history.

(56) References Cited

U.S. PATENT DOCUMENTS

| | | | |
|---|---|---|---|
| 2010/0209881 A1* | 8/2010 | Lin | G09B 19/167 434/66 |
| 2017/0232973 A1 | 8/2017 | Otake | |
| 2017/0329330 A1 | 11/2017 | Hatano et al. | |
| 2018/0004206 A1* | 1/2018 | Lagnemma | B60W 10/18 |
| 2019/0329651 A1* | 10/2019 | Favaretto | B62D 1/12 |

FOREIGN PATENT DOCUMENTS

| | | |
|---|---|---|
| JP | 2000-203301 A | 7/2000 |
| JP | 2017-144808 A | 8/2017 |
| JP | 2017-202720 A | 11/2017 |

* cited by examiner

*Primary Examiner* — Alan D Hutchinson
*Assistant Examiner* — Andy Schneider
(74) *Attorney, Agent, or Firm* — Dinsmore & Shohl LLP (57) ABSTRACT

A memory stores a plurality of steering angle characteristics including a first steering angle characteristic and a second steering angle characteristic. A steering angle characteristic selecting unit selects a selected steering angle characteristic from the steering angle characteristics stored in the memory. A driving control unit controls the steering angle of an autonomous-driving vehicle in accordance with the selected steering angle characteristic and a rightward or leftward operation amount of a mechanical operation unit of an autonomous-driving vehicle.

7 Claims, 7 Drawing Sheets

DRIVING CONTROL DEVICE OF AUTONOMOUS-DRIVING VEHICLE

CROSS REFERENCE TO RELATED APPLICATION

This application claims priority to Japanese Patent Application No. 2019-183707 filed on Oct. 4, 2019, which is incorporated herein by reference in its entirety including the specification, claims, drawings, and abstract.

TECHNICAL FIELD

The present disclosure relates to a driving control device of an autonomous-driving vehicle.

BACKGROUND

An autonomous-driving vehicle capable of autonomous driving has been known. Autonomous driving means executing driving control involving steering angle control (steering control) of wheels and vehicle speed control of the autonomous-driving vehicle at least partially by a computer. The steering angle of a wheel of the autonomous-driving vehicle is an angle between the central plane of the wheel (normally front wheel) and the front-rear direction of the vehicle. For simplicity, "the steering angle of the autonomous-driving vehicle" is used herein to represent the steering angle of the wheel of the autonomous-driving vehicle.

The autonomous-driving vehicle capable of being driven autonomously may also be controlled manually by an operator to control driving; consequently, a mechanical operation unit that enables manual driving control of the autonomous-driving vehicle has been installed on some autonomous-driving vehicles.

For example, JP 2000-203301 A discloses an automobile maneuvering operation device provided inside the autonomous-driving vehicle and including a joystick functioning as a mechanical operation unit capable of operating in four (front, rear, right, and left) directions and a control unit that controls acceleration, deceleration, and steering of the autonomous-driving vehicle.

The steering angle of the autonomous-driving vehicle may be controlled according to an operation amount of the mechanical operation unit (e.g., a tilt angle of the joystick in right and left directions or a rotation amount of the steering wheel). Conventionally, the steering angle characteristic represented by a relationship between the operation amount of the mechanical operation unit and the steering angle has been fixedly determined. For example, if the mechanical operation unit (e.g., the steering wheel) and the wheels are connected by a mechanical structure such as a steering shaft or a steering gear mechanism, as in conventional manual-driving vehicles operated by drivers, the steering angle characteristic is determined fixedly according to the characteristic of the mechanical structure. When the steering angle of the autonomous-driving vehicle is controlled by a control unit that detects the operation amount of the mechanical operation unit according to a detected operation amount, the steering angle characteristic referred to by the control unit has been determined fixedly.

Such a fixedly-determined steering angle characteristic would sometimes deteriorate operability of the mechanical operation unit in controlling the steering angle control of the autonomous-driving vehicle according to the surrounding conditions of the autonomous-driving vehicle. For example, in a case of a narrow drivable range of the autonomous-driving vehicle where the autonomous-driving vehicle can only travel in a limited range (e.g., when the autonomous-driving vehicle travels in a narrow lane), it is desirable that the steering angle of the autonomous-driving vehicle is small when the operation amount of the mechanical operation unit is small (less than a predetermined amount), thus preventing fluctuations of the autonomous-driving vehicle when running straight and further avoiding possible deviation from the road or unintentional contacting with a side wall. When the mechanical operation unit is operated largely (more than the predetermined operation amount), a large steering angle of the autonomous-driving vehicle is desirable to facilitate curving along a steep curve or a crossing. On the other hand, when the drivable range of the autonomous-driving vehicle is large (e.g., when the autonomous-driving vehicle travels in a wide lane), it is desirable that the steering angle of the autonomous-driving vehicle changes gradually with respect to the change of the operation amount of the mechanical operation unit.

It is an object of a driving control device of an autonomous-driving vehicle as disclosed herein to enhance operability of a mechanical operation unit which is used for steering angle control of the autonomous-driving vehicle according to surrounding conditions of the autonomous-driving vehicle.

SUMMARY

The driving control device of the autonomous-driving vehicle disclosed herein is a driving control device of an autonomous-driving vehicle capable of autonomous driving and includes a mechanical operation unit, a steering characteristic selecting unit that selects a selected steering angle characteristic from a plurality of steering angle characteristics, the plurality of steering angle characteristics being previously prepared and representing a relationship between an operation amount of the mechanical operation unit and a steering angle of the autonomous-driving vehicle, and a steering angle control unit that controls the steering angle of the autonomous-driving vehicle in accordance with the selected steering angle characteristic and the operation amount of the mechanical operation unit.

In the above-described structure, it is possible to select the selected steering angle characteristic in response to an instruction from an operator who drives the autonomous-driving vehicle. In particular, selecting the steering angle characteristic appropriate for the surrounding conditions of the autonomous-driving vehicle can enhance the operability of the mechanical operation unit used for the steering control of the autonomous-driving vehicle.

The steering angle characteristic selecting unit may select the selected steering angle characteristic in response to an instruction from the operator who drives the autonomous-driving vehicle.

The previously-prepared steering angle characteristics may include a first steering angle characteristic and a second steering angle characteristic, and the second steering angle characteristic is smaller than the first steering angle characteristic for an equal operation amount in a small operation amount region where the operation amount is smaller than a predetermined operation amount, while being larger than the steering angle of the first steering angle characteristic for the equal operation amount in a large operation amount region where the operation amount is equal to or larger than the predetermined operation amount.

The maximum steering angle of the second steering angle characteristic for the largest operation amount may be larger than the maximum steering angle of the first steering angle characteristic for the largest operation amount.

The driving control device of the autonomous-driving vehicle may further include a ranging sensor that detects an area of a drivable range around the autonomous-driving vehicle for which the autonomous-driving vehicle is drivable, in which the steering angle characteristic selecting unit selects the first steering angle characteristic when the area of the drivable range is equal to or larger than a threshold, while selecting the second steering angle characteristic when the area of the drivable range is smaller than the threshold.

The driving control device of the autonomous-driving vehicle may further include a vehicle speed control unit that controls a vehicle speed of the autonomous-driving vehicle in response to the operation of the mechanical operation unit, the vehicle speed control unit decelerating the autonomous-driving vehicle when the mechanical operation unit is unoperated in a manual driving mode.

The vehicle speed control unit may keep the autonomous-driving vehicle in a stopped state when the mechanical operation unit is unoperated and the autonomous-driving vehicle is stopped in the manual driving mode.

The driving control device of the autonomous-driving vehicle disclosed herein can enhance the operability of the mechanical operation unit for steering angle control of the autonomous-driving vehicle according to the surrounding conditions of the autonomous-driving vehicle.

BRIEF DESCRIPTION OF DRAWINGS

Embodiment of the present disclosure will be described with reference to the following figures, wherein.

DESCRIPTION OF EMBODIMENTS

Figure 1:
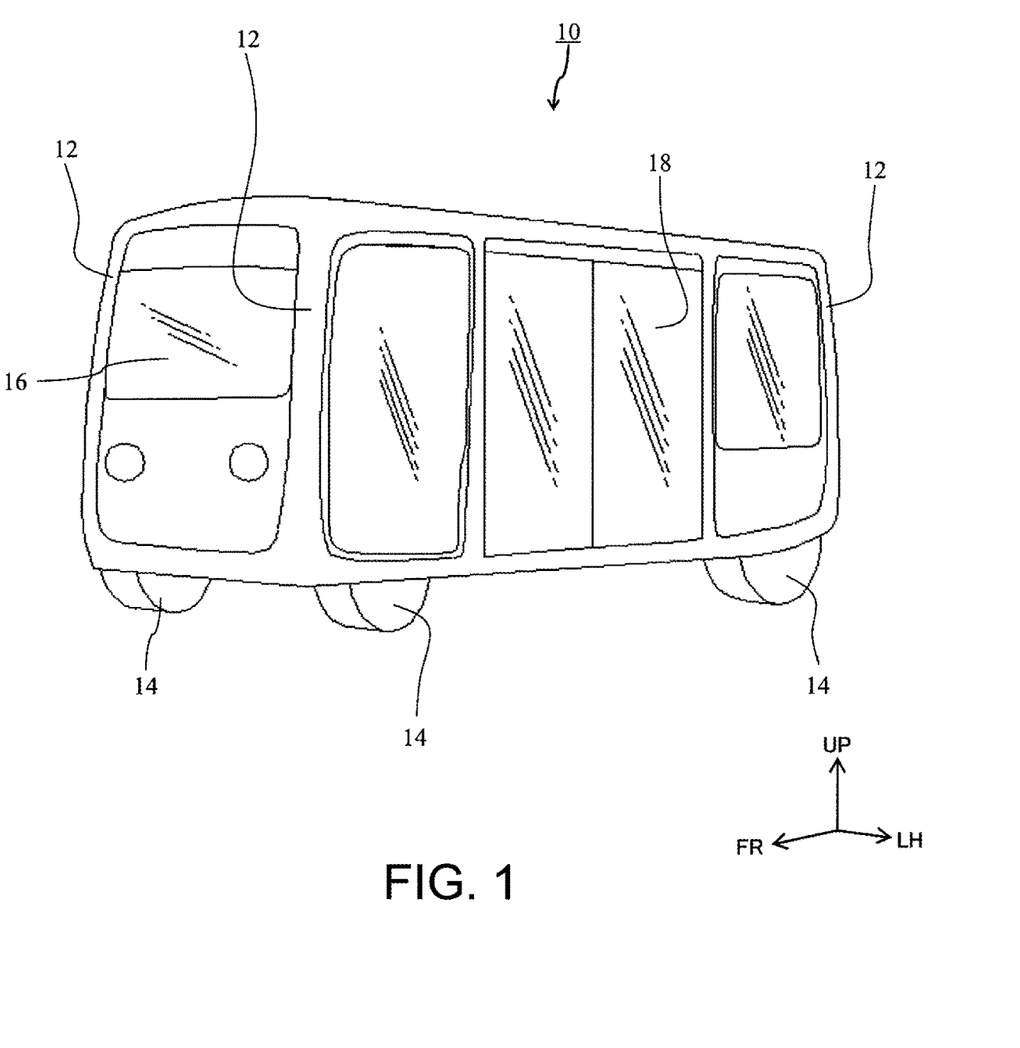
FIG. 1 is an outside view of an autonomous-driving vehicle according to an embodiment.
Figure 4:
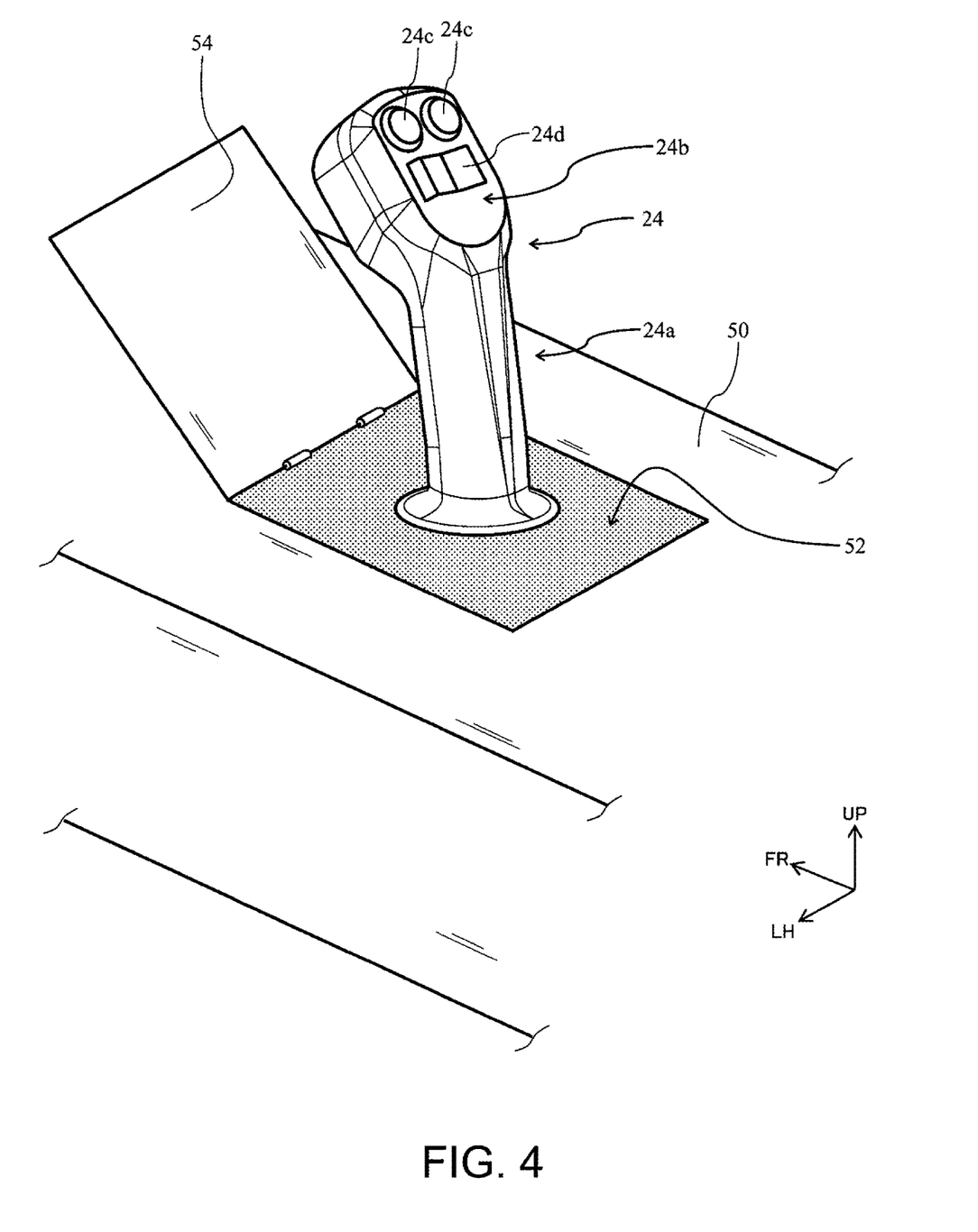
FIG. 4 is a perspective view of a mechanical operation unit.
Figure 5:
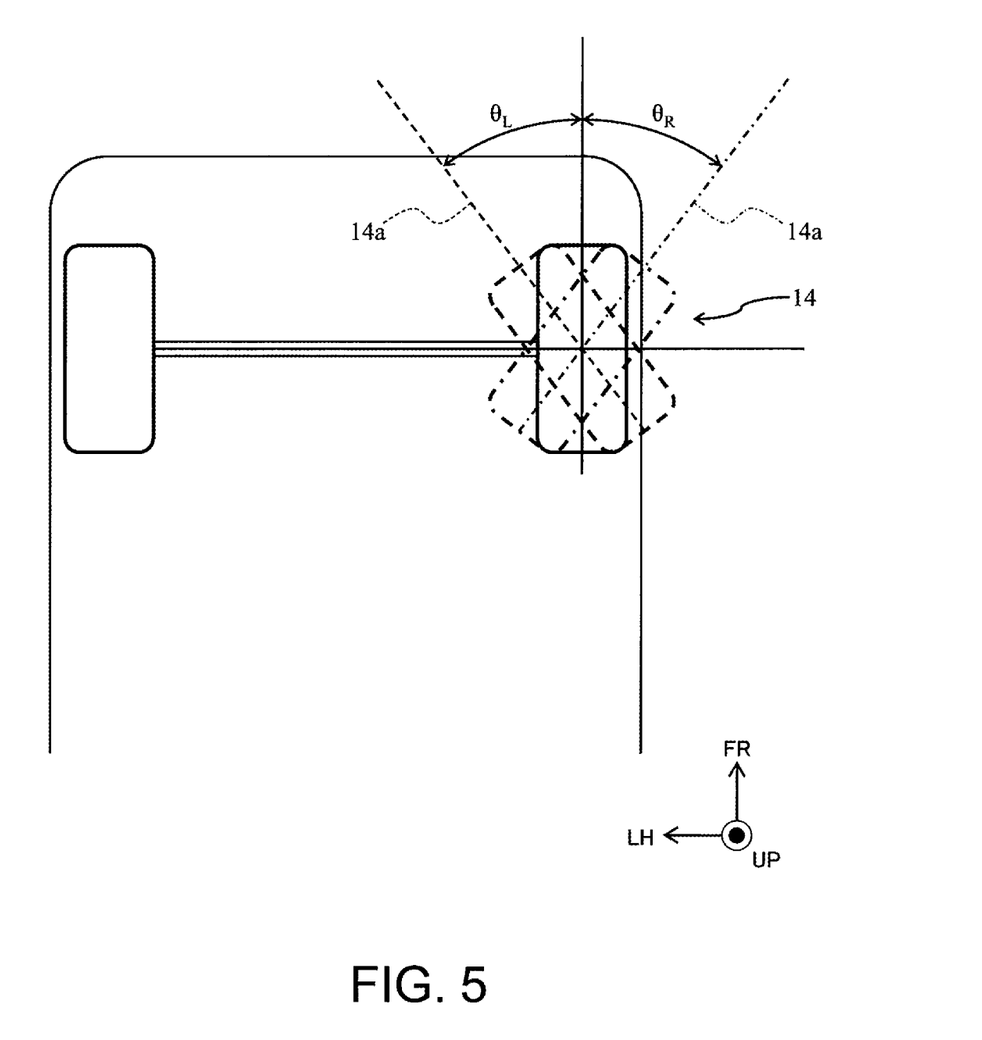
FIG. 5 illustrates steering angles of the autonomous-driving vehicle.

FIG. 1 is an outside view of an autonomous-driving vehicle 10 according to an embodiment. Note that, as indicated in FIG. 1 and FIGS. 4 and 5, which will be described later, FR represents the front of the vehicle in a front-rear direction of the vehicle, LH represents the left side of the vehicle when the vehicle faces frontward, and UP represents the upper direction of the vehicle in an up-down direction of the vehicle.

The autonomous-driving vehicle 10 is generally in a cuboid and symmetric shape in the front-rear direction of the vehicle. The outside design of the autonomous-driving vehicle 10 is also symmetric in the front-rear direction of the vehicle. Pillars 12 which extend vertically are provided respectively at four corners of the autonomous-driving vehicle 10 in a planar view. A wheel 14 is disposed under each pillar 12. Side walls on the front, rear, right, and left sides of the autonomous-driving vehicle 10 are partially provided as transparent or semi-transparent display panels 16 on which letters or the like can be displayed.

A slidable door 18 is provided as a part of the panel 16 on the left side surface. The slidable door 18 slides open to allow passengers to board and exit. Although not illustrated in FIG. 1, a retractable ramp is stored under the door 18 and used, for example, for boarding/offloading of wheel chairs.

The autonomous-driving vehicle 10 is a share-ride vehicle in which an unspecified number of passengers including an operator who controls (involving driving control) the autonomous-driving vehicle 10 ride together. In the present embodiment, the autonomous-driving vehicle 10 is used as a bus that travels along a fixed route within certain premises for transporting passengers. Therefore, the autonomous-driving vehicle 10 is expected to repeatedly start and stop relatively frequently. The autonomous-driving vehicle 10 is also expected to travel at a relatively low speed (e.g., not more than 30 km/h).

It is noted, however, that the utilization form of the autonomous-driving vehicle 10 disclosed herein can change, as necessary. For example, the autonomous-driving vehicle 10 may be used as a movable business space, such as a retail shop for displaying and selling various items, or as a place such as a restaurant for cooking and serving foods and beverages. In another utilization form, the autonomous-driving vehicle 10 may be used as an office for desk work or client meetings. Besides business scenes, the autonomous-driving vehicle 10 may also be used for private use for transportation. Further, a travel pattern of the autonomous-driving vehicle 10 may be changed appropriately.

The autonomous-driving vehicle 10 is an electric vehicle including a drive motor as a prime motor that receives power from a battery. The battery is a secondary battery capable of charging and discharging and is charged regularly with an external power supply. The autonomous-driving vehicle 10 may be another type of automobile other than the electric vehicle. For example, the autonomous-driving vehicle 10 may be a car using an engine as the prime motor, or a hybrid vehicle using both an engine and a drive motor as the prime motor. The autonomous-driving vehicle 10 may also be a hydrogen vehicle that operates the drive motor with electric power generated in the fuel battery.

The autonomous-driving vehicle 10 is a vehicle capable of autonomous driving. Specifically, the autonomous-driving vehicle 10 can be driven in a plurality of driving modes including an autonomous driving mode, a semi-autonomous driving mode, and a manual driving mode.

In the autonomous driving mode, the driving control is mostly executed by a computer (a driving control unit which will be described later) installed in the autonomous-driving vehicle 10. In the present disclosure, the concept of the driving control involves gear change control, vehicle speed control, and steering control (i.e., the steering angle control of the autonomous-driving vehicle 10). The concept of the vehicle speed control involves start control, stop control, and acceleration/deceleration control of the autonomous-driving vehicle 10. The autonomous-driving vehicle 10 is configured to be communicable with a management center that manages and controls a plurality of autonomous-driving vehicles 10. In the autonomous driving mode, the autonomous-driving vehicle 10 travels along a predetermined route under the control of the management center. In the autonomous driving mode, the driving control is executed by the computer according to driving instruction from the management center, but the start control to restart from the stopped state is executed only by the operation of the operator. In addition, the operator can decelerate the autonomous-driving vehicle 10 during the autonomous driving in the autonomous driving mode, the details of which will be described later.

The semi-autonomous driving mode is a driving mode in which the driving control of the autonomous-driving vehicle 10 is mostly executed by the driving control unit. In the semi-autonomous driving mode, the driving control unit executes the driving control in accordance with detection results of various sensors (e.g., a camera, a laser imaging detection and ranging (LIDAR), and the like) installed in the autonomous-driving vehicle 10. In the semi-autonomous driving mode, the start control to restart from the stopped state is also executed only by the operation of the operator. The operator can also decelerate the autonomous-driving vehicle 10 in the autonomous driving even in the semi-autonomous driving mode.

In the manual driving mode, the autonomous-driving vehicle 10 does not execute autonomous driving, but the operator executes the driving control of the autonomous-driving vehicle 10.

As described above, the autonomous-driving vehicle 10 travels along a fixed route within specific premises, but the autonomous-driving vehicles 10 basically travel in the autonomous driving mode while driving along the fixed route. The semi-autonomous driving mode or the manual driving mode is used while the autonomous-driving vehicle 10 leaves a waiting place and returns to the fixed route, or when the autonomous-driving vehicle 10 detours from the fixed route and moves to the waiting place.

Figure 2:
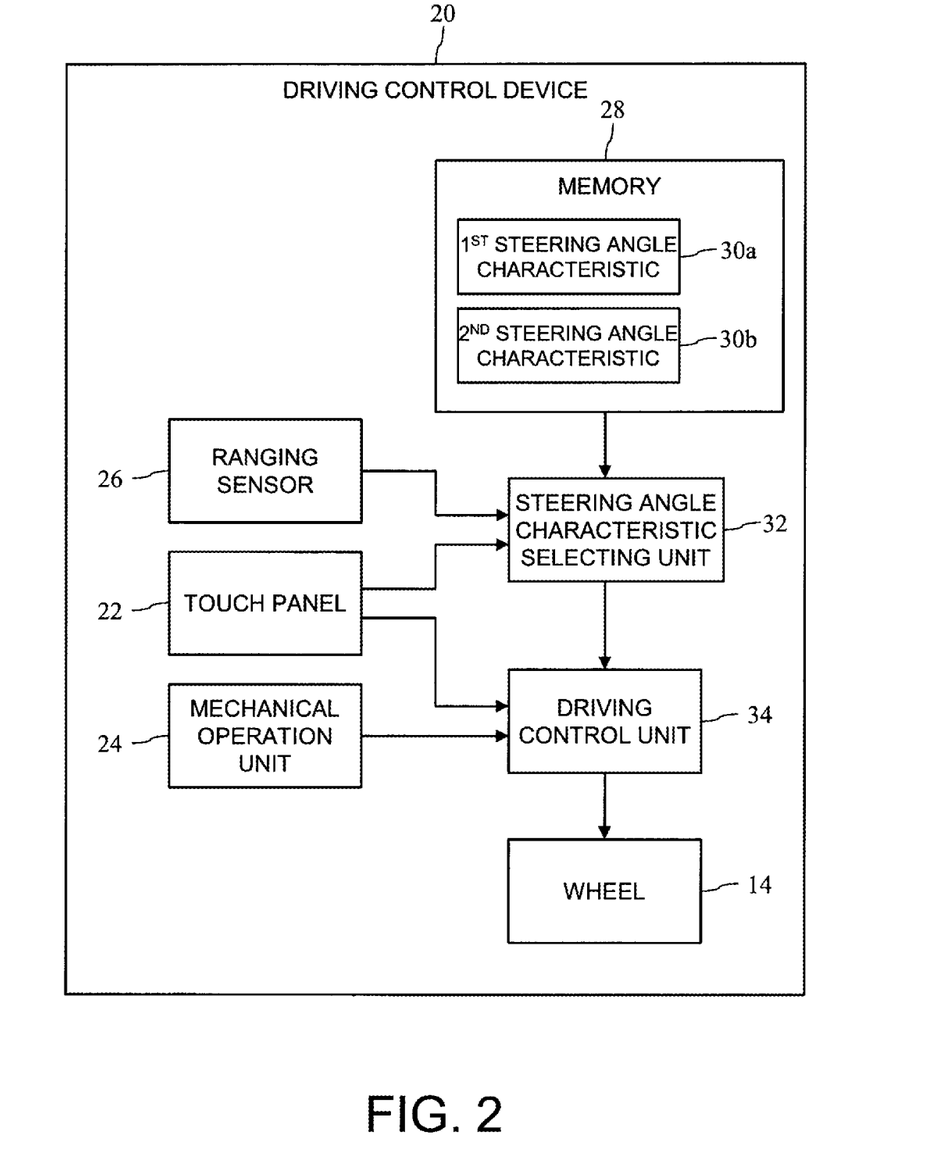
FIG. 2 is a functional block diagram of a driving control device according to the embodiment.

FIG. 2 is a functional block diagram of a driving control device 20 according to the present embodiment. In the present embodiment, respective parts of the driving control device 20 are installed in the autonomous-driving vehicle 10.

A touch panel 22 includes, for example, a liquid crystal display, a touch center, and the like. The touch panel 22 may be disposed in the vicinity of the operator seat to enable operation by the operator on the autonomous-driving vehicle 10.

Figure 3:
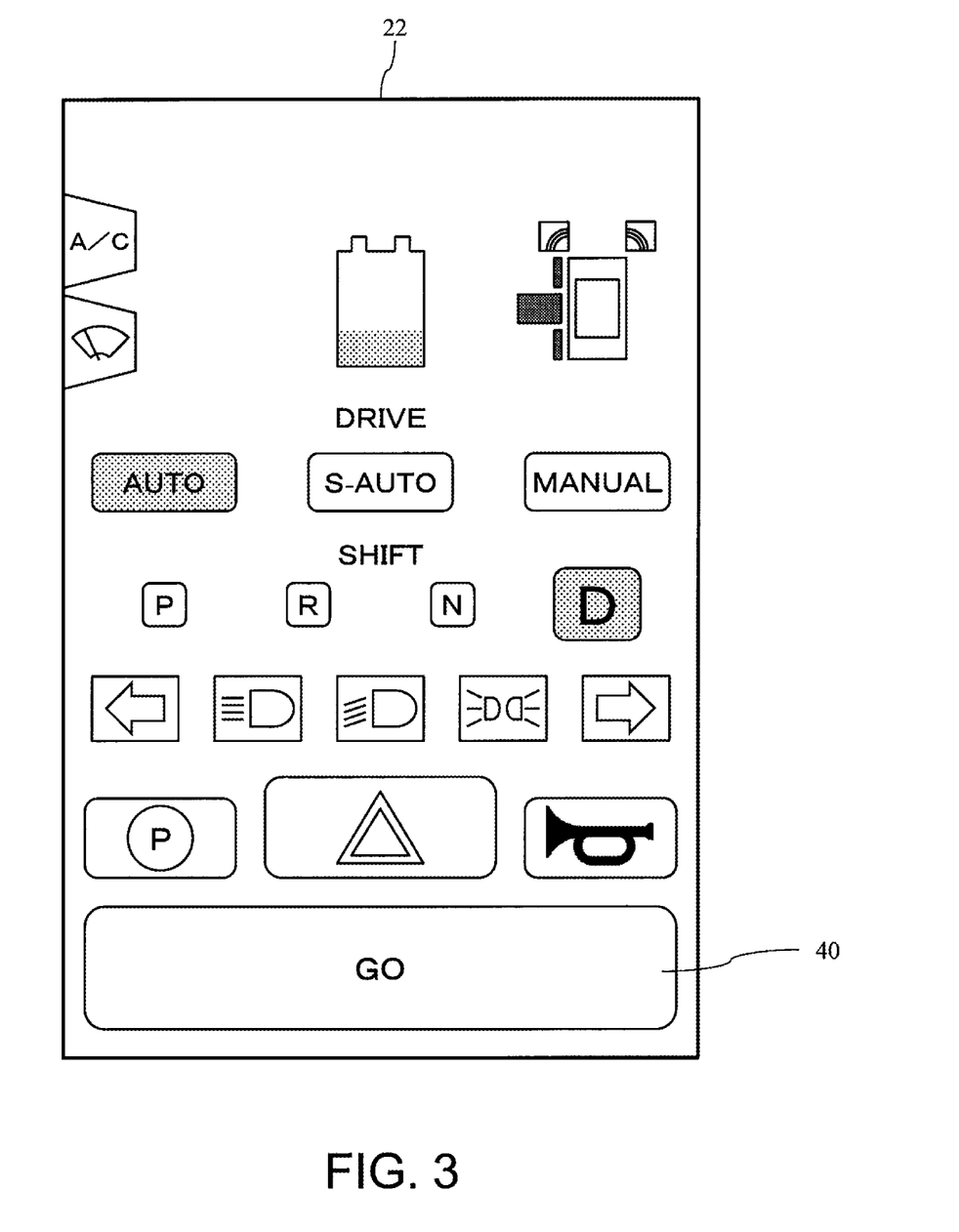
FIG. 3 illustrates an example of a touch panel screen.

FIG. 3 illustrates an example of a screen displayed on the touch panel 22. As illustrated in FIG. 3, various buttons are displayed on the touch panel 22, and the operator can enter control instructions to the autonomous-driving vehicle 10 with the buttons displayed on the touch panel 22. In particular, the autonomous-driving vehicle 10 can be started by operating a GO button 40 displayed on the touch panel 22. If the driving mode of the autonomous-driving vehicle 10 is the autonomous driving mode or the semi-autonomous driving mode, the autonomous driving starts after the autonomous-driving vehicle 10 starts moving in response to the operation of the GO button 40. In this case, a SLOWDOWN button appears after the start, in place of the GO button 40, on the touch panel 22 to decelerate the autonomous-driving vehicle 10, so that the operator can perform deceleration control of the autonomous-driving vehicle 10 even during the autonomous driving. If the driving mode of the autonomous-driving vehicle 10 is the manual driving mode, the operator operates a mechanical operation unit 24, which will be described later, subsequent to operating the GO button 40 to drive the autonomous-driving vehicle 10.

Referring to FIG. 2 again, the mechanical operation unit 24 is provided to control driving of the autonomous-driving vehicle 10 manually by the operator. The mechanical operation unit 24 is operated by the operator to operate mechanically. The mechanical operation unit 24 is not like an acceleration pedal or a braking pedal, which is usually provided in conventional vehicles, and is operated by hand.

In this respect, the mechanical operation unit 24 is disposed at least above the seat surface of the operator seat. To facilitate operation by the operator, the mechanical operation unit 24 may be disposed on an arm rest configured to rest the arm of the operator.

Upon operation of the mechanical operation unit 24 by the operator, operation information representing the content (e.g., direction) of operation and the amount of operation are transmitted to a driving control unit 34, which will be described later, from the mechanical operation unit 24. In accordance with such operation information, various kinds of driving control of the autonomous-driving vehicle 10 are executed by the driving control unit 34. In the present embodiment, the mechanical operation unit 24 is capable of vehicle speed control and the steering control of the autonomous-driving vehicle 10.

The mechanical operation unit 24 is mainly used when the driving mode of the autonomous-driving vehicle 10 is the manual driving mode, but the mechanical operation unit 24 may also be used for driving control when the autonomous-driving vehicle 10 is in the autonomous driving mode or the semi-autonomous driving mode. In the autonomous driving mode or the semi-autonomous driving mode, the driving control instruction from the mechanical operation unit 24 is prioritized over the driving control in accordance with the detection result of various sensors (e.g., the camera or the LIDAR) of the autonomous-driving vehicle 10.

FIG. 4 is a perspective view of the mechanical operation unit 24 of the present embodiment. The mechanical operation unit 24 of the present embodiment is a stick-type unit extending vertically. Specifically, the mechanical operation unit 24 includes a grip portion 24a having a vertically-extending shape, and a switch seat portion 24b located on the upper side of the grip portion 24a. The operator can operate the lever of the mechanical operation unit 24 while gripping the grip portion 24a. Specifically, the mechanical operation unit 24 can be pulled down in front, rear, right, and left directions about the lower end of the mechanical operation unit 24. If the operator disengages his/her hand off the mechanical operation unit 24; that is, when the mechanical operation unit 24 is unoperated by the operator, the grip portion 24a naturally returns to a state in which the grip portion 24a extends in a direction matching the vertical direction (this state is referred to as a "neutral state" in the present disclosure).

When the mechanical operation unit 24 is pulled down in one of the front, rear, right, and left directions, operation information representing a pulling-down direction and a pulling-down angle are transmitted as the content of operation and the amount of operation, respectively, to the driving control unit 34. In the present embodiment, the autonomous-driving vehicle 10 accelerates as the mechanical operation unit 24 is pulled down frontward, the autonomous-driving vehicle 10 decelerates as the mechanical operation unit 24 is pulled down rearward, the autonomous-driving vehicle 10 turns right as the mechanical operation unit 24 is pulled down rightward (i.e., the steering angle of the autonomous-driving vehicle 10 increases rightward), and the autonomous-driving vehicle 10 turns left as the mechanical operation unit 24 is pulled down leftward (i.e., the steering angle of the autonomous-driving vehicle 10 increases leftward).

The switch seat portion 24b includes a blinker switch 24c for operating blinkers and a horn switch 24d for sounding the horn, so that the mechanical operation unit 24 can control instruments (blinkers and horn) provided on the autonomous-driving vehicle 10 in addition to the driving control.

As illustrated in FIG. 4, the mechanical operation unit 24 of the present embodiment, in a usable state, stands on the upper surface of an arm rest 50 on which the operator rests his/her arm. In the usable state, the mechanical operation unit 24 is pushed downward to be retracted in a housing 52 formed in the arm rest 50. The housing 52 may have a lid 54. Storing the mechanical operation unit 24 in the housing 52 in the unused state prevents possible error of operating the mechanical operation unit 24.

The autonomous-driving vehicle 10 does not include any operation unit that operates mechanically to control driving of the autonomous-driving vehicle 10 other than the mechanical operation unit 24. For example, the autonomous-driving vehicle 10 does not include a foot pedal operated by foot, such as an accelerator pedal or a braking pedal, for entering the vehicle speed control instruction.

Referring to FIG. 2 again, a ranging sensor 26 includes components such as a camera for shooting the surroundings (front, rear, right, and left) of the vehicle or a LIDAR that measures a distance from a vehicle to an obstacle located around the vehicle. The ranging sensor 26 detects an area of a drivable range around the autonomous-driving vehicle 10, in which the autonomous-driving vehicle 10 can travel. For example, the ranging sensor 26 can be a camera which takes a photo image from which a lane width, in which the autonomous-driving vehicle 10 travels, can be detected. The ranging sensor 26 such as a camera or LIDAR can measure the distance from the autonomous-driving vehicle 10 to an obstacle (e.g., a side wall) located on the front, rear, right, or left of the autonomous-driving vehicle 10.

A memory 28 includes, for example, a read-only memory (ROM), a random-access memory (RAM), or an embedded multi-media card (eMMC). The memory 28 stores a plurality of steering characteristics prepared previously. The steering angle characteristic represents a relationship between the operation amount of the mechanical operation unit 24 and the steering angle of the autonomous-driving vehicle 10. As illustrated in FIG. 2, the memory 28 stores two steering angle characteristics including a first steering angle characteristic 30a and a second steering angle characteristic 30b, but the memory 28 may store three or more steering angle characteristics.

Before describing the steering angle characteristic, the steering angle of the autonomous-driving vehicle 10 is described. FIG. 5 is a plan view of a front wheel 14 of the autonomous-driving vehicle 10. As described above, the steering angle of the autonomous-driving vehicle 10 is formed between the front-rear direction of the vehicle and the central surface of the wheel 14. When the wheel 14 is tilted rightward as indicated by a dash-dotted line in FIG. 5, a rightward steering angle $\theta_R$ is formed between the central surface 14a (dash-dotted line) of the wheel 14 and the front-rear direction of the vehicle. When the wheel 14 is tilted leftward as indicated by a broken line in FIG. 5, a leftward steering angle $\theta_L$ is formed between the central surface 14a (broken line) of the wheel 14 and the front-rear direction of the vehicle.

Figure 6:
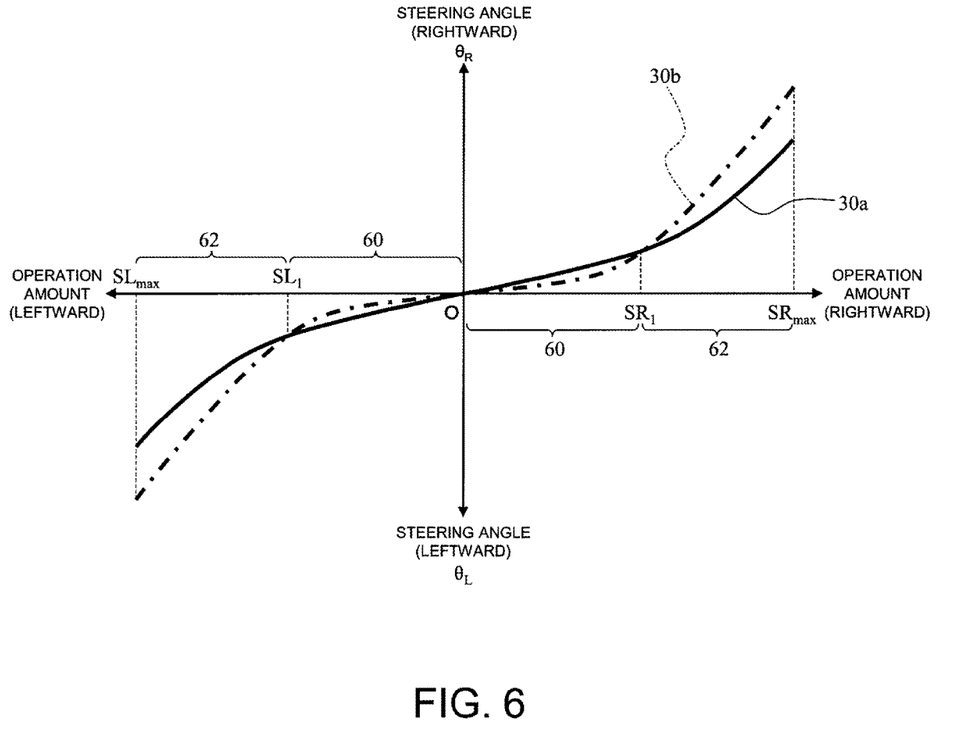
FIG. 6 is a graph plotting a first steering angle characteristic and a second steering angle characteristic.

FIG. 6 is a graph plotting the first steering angle characteristic 30a and the second steering angle characteristic 30b. The memory 28 stores a formula (a formula using the operation amount as a variable to determine the steering angle) which is represented by the graph illustrated in FIG. 6.

In FIG. 6, the horizontal axis represents the operation amount of the mechanical operation unit 24. The origin O of the horizontal axis; that is, the point where the operation amount is zero, indicates a state in which the mechanical operation unit 24 is unoperated, that is, a neutral state. As described above, in the present embodiment pulling down the mechanical operation unit 24 from side to side is the operation to control the steering angle of the autonomous-driving vehicle 10, and the operation amount is represented by the amount of pulling down the mechanical operation unit 24 rightward or leftward; i.e., the angle formed between the vertical direction and the center axis of the mechanical operation unit 24 in the right-left direction. A region to the right of the origin O in FIG. 6 indicates a state in which the mechanical operation unit 24 is pulled down rightward. The rightward operation amount of the mechanical operation unit 24 increases (i.e., the mechanical operation unit 24 is pulled down further rightward) as the graph goes rightward from the origin O. The region on the left of the origin O indicates a state where the mechanical operation unit 24 is pulled down leftward. The leftward operation amount of the mechanical operation unit 24 increases (i.e., the mechanical operation unit 24 is pulled down further leftward) as the graph goes leftward from the origin O.

The vertical axis of FIG. 6 represents the steering angle of the autonomous-driving vehicle 10. The origin O of the vertical axis indicates a state in which the steering angle is zero. The region above the origin O indicates a state in which the wheels 14 are tilted rightward. The steering angle $\theta_R$ increases as the graph goes upward from the origin O. The region below the origin O indicates a state in which the wheels 14 are tilted leftward. The steering angle $\theta_L$ increases as the graph goes downward from the origin O.

The first steering angle characteristic 30a and the second steering angle characteristic 30b are such that the steering angle of the autonomous-driving vehicle 10 increases, as the operation amount of the mechanical operation unit 24 increases. The first and second steering angle characteristics 30a and 30b are point-symmetric about the origin O. That is, the same steering angle of the autonomous-driving vehicle 10 is provided for an equal operation amount when the mechanical operation unit 24 is pulled down side to side.

Both the first and second steering angle characteristics 30a and 30b are represented by curved lines. Specifically, when the operation amount is small, an amount of change of the steering angle (i.e., a slope of the tangential line of the first or second steering angle characteristic) for the unit operation amount is smaller than that in the case of a large operation amount. In other words, when the operation amount of the mechanical operation unit 24 is small (i.e., the pulling-down amount is small), the steering angle of the autonomous-driving vehicle 10 does not change largely as compared to the case of a large operation amount (i.e., the pulling-down amount is large). This decreases fluctuations of the autonomous-driving vehicle 10 when the autonomous-driving vehicle 10 runs straight (i.e., when the operation amount of the mechanical operation unit 24 is small).

As described above, in the case of a narrow drivable range of the autonomous-driving vehicle 10 for which the autonomous-driving vehicle 10 is drivable (e.g., when the autonomous-driving vehicle 10 travels in a narrow lane), it is desirable that the steering angle of the autonomous-driving vehicle 10 is small when the operation amount of the mechanical operation unit 24 is small. This is to prevent fluctuations of the autonomous-driving vehicle 10 when running straight and avoid going off the road or contacting the side wall. On the other hand, when the operation amount of the mechanical operation unit 24 is large, a large steering angle of the autonomous-driving vehicle 10 is desirable to enable the autonomous-driving vehicle 10 to easily turn the steep curve or the crossing.

Comparing the first and second steering angle characteristics 30a and 30b, it is found that the steering angle of the second steering angle characteristic 30b is smaller than that of the first steering angle characteristic 30a for the equal operation amount in a small operation amount region 60 where the operation amount is smaller than a predetermined operation amount $SR_1$ or $SL_1$. In a large operation amount region 62 where the operation amount is equal to or larger than the predetermined operation amount $SR_1$ or $SL_1$, the steering angle of the second steering angle characteristic 30b for the equal operation amount is larger than that of the first steering angle characteristic 30a.

Therefore, the second steering angle characteristic 30b can be more appropriate than the first steering angle characteristic 30a in the narrow drivable range around the autonomous-driving vehicle 10.

On the other hand, in the wide drivable range around the autonomous-driving vehicle 10 (e.g., the autonomous-driving vehicle 10 travels in a wide lane), it is desirable that the steering angle of the autonomous-driving vehicle 10 changes gradually relative to the change in the operation amount of the mechanical operation unit 24 to facilitate the autonomous-driving vehicle 10 to turn the curve smoothly.

As illustrated in FIG. 6, the steering angle of the first steering angle characteristic 30a is larger than that of the second steering angle characteristic 30b for the equal operation amount in the small operation amount region 60, and vice versa in the large operation amount region 62. Overall, therefore, the steering angle of the first steering angle characteristic 30a changes more gradually relative to the operation amount than in the second steering angle characteristic 30b.

Thus, the first steering angle characteristic 30a is more appropriate than the second steering angle characteristic 30b in the wide drivable range around the autonomous-driving vehicle 10.

The maximum steering angle of the second steering angle characteristic 30b for the largest operation amount $SR_{max}$, $SL_{max}$ of the mechanical operation unit 24 is larger than the maximum steering angle of the first steering angle characteristic 30a for the largest operation amount $SR_{max}$, $SL_{max}$. This means that selecting the second steering angle characteristic 30b rather than the first steering angle characteristic 30a can further decrease the minimum radius of rotation of the autonomous-driving vehicle 10; that is, the autonomous-driving vehicle 10 can turn in a smaller radius. From this point of view, it can also be noted that the second steering angle characteristic 30b is more appropriate than the first steering angle characteristic 30a in the narrow drivable range around the autonomous-driving vehicle 10.

A steering angle characteristic selecting unit 32 and the driving control unit 34 described below are implemented by hardware such as a processor in cooperation with software for activating such hardware.

Figure 7:
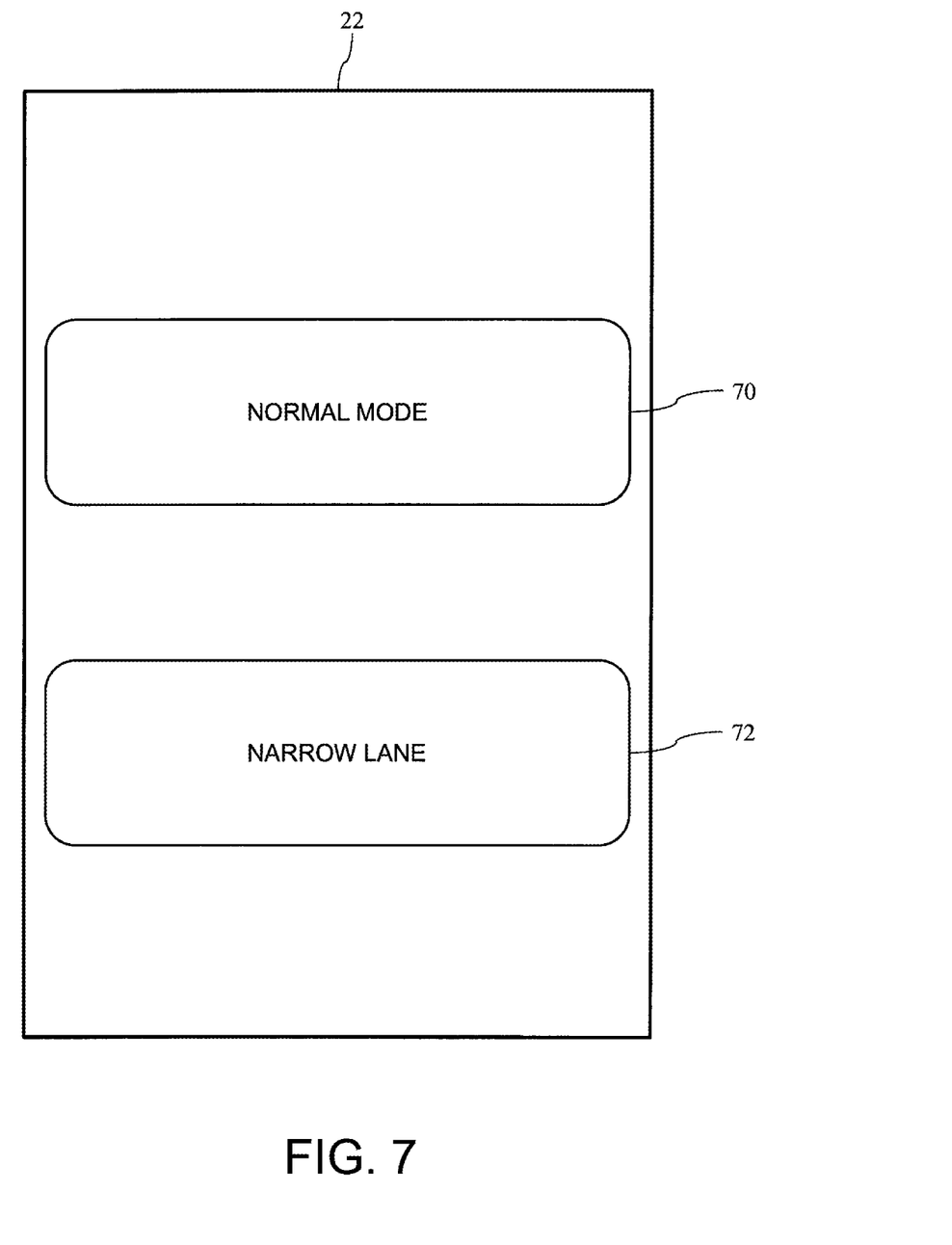
FIG. 7 illustrates an example of a steering angle characteristic selection screen.

The steering angle characteristic selecting unit 32 selects a selected steering angle characteristic which is referred to the driving control unit 34 among the steering angle characteristics stored in the memory 28. In the present embodiment, in response to an instruction from the operator the steering angle characteristic selecting unit 32 selects the selected steering angle characteristic from the steering angle characteristics stored in the memory 28. Specifically, the operator inputs the instruction to select the steering angle characteristic on the touch panel 22, and the touch panel 22 displays the steering angle selecting screen as illustrated in FIG. 7. The example of FIG. 7 displays the first steering angle characteristic 30a as a normal mode and the second steering angle characteristic 30b as a narrow lane mode. The operator operates a normal mode button 70, and the steering angle characteristic selecting unit 32 correspondingly selects the first steering angle characteristic 30a as the selected steering angle characteristic. On the other hand, the operator operates a narrow lane mode button 72, and the steering angle characteristic selecting unit 32 correspondingly selects the second steering angle characteristic 30b as the selected steering angle characteristic.

Alternatively, the steering angle characteristic selecting unit 32 may select the selected steering angle characteristic automatically (i.e., without the instruction from the operator) from the steering angle characteristics stored in the memory 28 according to the detection result of the ranging sensor 26. First, a threshold of the area of the drivable range around the autonomous-driving vehicle 10 is determined previously. The threshold may be a threshold of a width of the lane in which the autonomous-driving vehicle 10 travels. Alternatively, the threshold may be a threshold representative value (e.g., an average value, a minimum value, etc.) of a distance to an obstacle located on the front, rear, right, or left of the autonomous-driving vehicle 10. Then, the steering angle characteristic selecting unit 32 selects the selected steering angle characteristic according to a result of comparison between the area and the threshold of the drivable range around the autonomous-driving vehicle 10 detected by the ranging sensor 26.

As described above, the second steering angle characteristic 30b is more appropriate than the first steering angle characteristic 30a in the case of the narrow drivable range around the autonomous-driving vehicle 10. The first steering angle characteristic 30a is more appropriate than the second steering angle characteristic 30b in the case of the wide drivable area around the autonomous-driving vehicle 10. Therefore, the steering angle characteristic selecting unit 32 selects the first steering angle characteristic 30a as the selected steering angle characteristic when the area of the drivable range around the autonomous-driving vehicle 10 is equal to or larger than the threshold, while selecting the second steering angle characteristic 30b as the selected steering angle characteristic when the area of the drivable range around the autonomous-driving vehicle 10 is smaller than the threshold.

The driving control unit 34 controls driving of the autonomous-driving vehicle 10. Specifically, in the autonomous driving mode, the driving control unit 34 receives a start instruction via the touch panel 22 from the operator operating the GO button 40 (see FIG. 3) of the touch panel 22, and correspondingly starts the autonomous-driving vehicle 10 and performs vehicle speed control and steering angle control according to the driving instruction transmitted from the management center. In the semi-autonomous driving mode of the autonomous-driving vehicle 10, the driving control unit 34 receives the start instruction via the touch panel 22 from the operator operating the GO button 40 on the touch panel 22, and correspondingly performs the vehicle speed control and the steering angle control according to the detection results from the various sensors of the autonomous-driving vehicle 10.

Further, the driving control unit 34 performs driving control of the autonomous-driving vehicle 10 in response to the operation of the mechanical operation unit 24 in any driving mode of the autonomous-driving vehicle 10.

Specifically, the driving control unit 34 controls the steering angle (of the wheels 14) of the autonomous-driving vehicle 10 in accordance with the selected steering angle characteristic selected by the steering angle characteristic selecting unit 32 and the operation amount of the mechanical operation unit 24 in the right or left direction.

Specifically, the driving control unit 34 refers to the selected steering angle characteristic (see FIG. 6) to specify the steering angle corresponding to the operation direction and the operation amount of the mechanical operation unit 24, and controls the orientation of the wheels 14 to put the wheels 14 in the specified steering angle. Thus, the driving control unit 34 also functions as the steering angle control unit.

The driving control unit 34 controls the driving motor, the engine, or the braking device in accordance with the operation amount of the mechanical operation unit 24 in the front-rear direction, and controls the vehicle speed of the autonomous-driving vehicle 10. Thus, the driving operation unit also functions as the vehicle speed control unit. In detail, the driving control unit 34 largely accelerates the autonomous-driving vehicle 10 as the mechanical operation unit 24 is further pulled down frontward, while decelerating the autonomous-driving vehicle 10 as the mechanical operation unit 24 is further pulled down rearward.

In the present embodiment, when the autonomous-driving vehicle 10 is in the manual driving mode and traveling, and the mechanical operation unit 24 is unoperated by the operator (i.e., the mechanical operation unit 24 is in the neutral state), the driving control unit 34 decelerates the autonomous-driving vehicle 10. Accordingly, it is possible to prevent continued traveling of the autonomous-driving vehicle 10 if the operator is unable to operate the mechanical operation unit 24 for some reason during traveling of the autonomous-driving vehicle 10 in the manual driving mode. That is, the safety of the autonomous-driving vehicle 10 can be secured.

In the case where the autonomous-driving vehicle 10 is in the manual driving mode and the mechanical operation unit 24 is unoperated by the operator, the driving control unit 34 controls the autonomous-driving vehicle 10 to continue the stopped state. Specifically, to prevent advancing of the autonomous-driving vehicle 10 by the creep phenomenon or sliding down on a slope of the autonomous-driving vehicle 10 while being stopped on the slope, the driving control unit 34 keeps the autonomous-driving vehicle 10 in the stopped state.

To control the autonomous-driving vehicle 10 to be kept in the stopped state, the brake may be activated by controlling the braking device, or the drive motor or the engine may be controlled to generate torque to such an extent to maintain the stop state.

As described above, the steering angle of the autonomous-driving vehicle 10 is controlled in accordance with the selected steering angle characteristic selected from the previously-prepared steering angle characteristics. In particular, selecting the steering angle characteristic appropriate for the surrounding conditions of the autonomous-driving vehicle 10 can enhance the operability of the mechanical operation unit 24 for the steering angle control of the autonomous-driving vehicle 10. For example, the first steering angle characteristic 30a is selected in the case of the wide drivable range around the autonomous-driving vehicle 10, while the second steering angle characteristic 30b is selected in the case of the narrow drivable range around the autonomous-driving vehicle 10, to enhance the operability of the mechanical operation unit 24 for the steering angle control of the autonomous-driving vehicle 10.

While the embodiment of the driving control device of the autonomous-driving vehicle according to the present disclosure has been described, the embodiment is not intended to limit the scope of the disclosure, and may be embodied in a variety of other forms without departing from the spirit of the present disclosure.

For example, the mechanical operation unit 24 of the above-described embodiment is the stick-type unit capable of being pulled down back and forth and side to side, but the mechanical operation unit 24 is not limited to this and may be a slider knob movable back and forth and side to side. In this case, the operation amount of the mechanical operation unit 24 is represented by a rightward or leftward displacement of the slider knob, and the driving control unit 34 functioning as the steering angle control unit controls the steering angle of the autonomous-driving vehicle 10 corresponding to the selected steering angle characteristic and the rightward or leftward displacement of the slider knob.

The mechanical operation unit 24 may be a cross key (a complex button including four buttons corresponding to the front, rear, right, and left directions). In this case, the driving control unit 34 functioning as the steering angle control unit controls the steering angle of the autonomous-driving vehicle 10 according to the amount of time during which the right or left button of the cross key is continuously pushed.

In the above-described embodiment, respective parts of the driving control device 20 are installed in the autonomous-driving vehicle 10, and the mechanical operation unit 24 is operated by the operator who is in the autonomous-driving vehicle 10. Alternatively, the mechanical operation unit 24 may be installed in the management center that manages a plurality of autonomous-driving vehicles 10, and it is desirable that the operator located external to the autonomous-driving vehicles 10 can select the steering angle.

For example, a steering angle selecting screen as illustrated in FIG. 7 is displayed on a terminal provided at the management center. When the operator selects the steering angle, the information representing the selected steering angle is transmitted from the terminal to the autonomous-driving vehicle 10. The steering angle characteristic selecting unit 32 selects the selected steering angle characteristic in accordance with the information received from the terminal. On the other hand, when the operator operates the mechanical operation unit 24 provided at the management center, the operation information representing the content (e.g., direction) of operation and the amount of operation are transmitted to the autonomous-driving vehicle 10. The driving control unit 34 controls the steering angle of the autonomous-driving vehicle 10 in accordance with the selected steering angle characteristic and the received operation information.

The invention claimed is:

1. A driving control device of an autonomous-driving vehicle capable of autonomous driving, comprising:
    a joystick; and
    one or more processors configured to:
    select a selected steering angle characteristic from a plurality of steering angle characteristics, the plurality of steering angle characteristics being previously prepared and representing a relationship between an operation amount of the joystick and a steering angle of the autonomous-driving vehicle; and
    control the steering angle of the autonomous-driving vehicle in accordance with the selected steering angle characteristic and the operation amount of the joystick, wherein
    the previously prepared steering angle characteristics include a first steering angle characteristic and a second steering angle characteristic, and the second steering angle characteristic is smaller than the first steering angle characteristic for an equal operation amount in a small operation amount region where the operation amount is smaller than a predetermined operation amount, while being larger than the first steering angle characteristic for the equal operation amount in a large operation amount region where the operation amount is equal to or larger than the predetermined operation amount.

2. The driving control device of the autonomous-driving vehicle capable of autonomous driving according to claim 1, wherein
the one or more processors are further configured to select the selected steering angle characteristic in response to an instruction from an operator who drives the autonomous-driving vehicle.

3. The driving control device of the autonomous-driving vehicle capable of autonomous driving according to claim 1, wherein
in the first steering angle characteristic and the second steering angle characteristic, an amount of change of the steering angle for a unit operation amount in the small operation amount region is smaller than an amount of change of the steering angle for the unit operation amount in the large operation amount region.

4. The driving control device of the autonomous-driving vehicle capable of autonomous driving according to claim 3, wherein
a maximum steering angle of the second steering angle characteristic for a largest operation amount is larger than a maximum steering angle of the first steering angle characteristic for the largest operation amount.

5. The driving control device of the autonomous-driving vehicle capable of autonomous driving according to claim 3 further comprising:
a ranging sensor that detects—an area of a drivable range around the autonomous-driving vehicle for which the autonomous-driving vehicle is drivable wherein
the one or more processors are further configured to select the first steering angle characteristic when the area of the drivable range is equal to or larger than a threshold, while selecting the second steering angle characteristic when the area of the drivable range is smaller than the threshold.

6. The driving control device of the autonomous-driving vehicle capable of autonomous driving according to claim 1, wherein the one or more processors are further configured to:
control a vehicle speed of the autonomous-driving vehicle in response to the operation of the joystick and decelerate the autonomous-driving vehicle when the joystick is unoperated in a manual driving mode.

7. The driving control device of the autonomous-driving vehicle capable of autonomous driving according to claim 6, wherein the one or more processors are further configured to
keep the autonomous-driving vehicle in a stopped state when the joystick is unoperated and the autonomous-driving vehicle is stopped in the manual driving mode.

* * * * *